United States Patent [19]

Rauenbusch

[11] Patent Number: 5,915,445

[45] Date of Patent: Jun. 29, 1999

[54] SECTIONAL OVERHEAD GATE

[75] Inventor: Gerd Rauenbusch, Wehr, Germany

[73] Assignees: Wihag Nutzfahrzeugtechnik GmbH&Co. KG, Bielefeld, Germany; Tubus Bauer AG, Baar, Switzerland

[21] Appl. No.: 09/025,458

[22] Filed: Feb. 18, 1998

[30] Foreign Application Priority Data

Feb. 21, 1997 [DE] Germany ............................ 297 03 077

[51] Int. Cl.$^6$ ........................................................ E06B 3/12
[52] U.S. Cl. ............................................................. 160/230
[58] Field of Search ................................. 160/230, 231.1, 160/231.2, 232, 135, 201, 133, 370.23

[56] References Cited

U.S. PATENT DOCUMENTS

| | | | |
|---|---|---|---|
| 3,017,218 | 1/1962 | Groth et al. | 160/232 X |
| 3,084,403 | 4/1963 | Elmendorf | 160/133 |
| 3,662,410 | 5/1972 | Lankheet | 160/201 X |
| 4,194,313 | 3/1980 | Downing | 160/135 X |
| 5,131,448 | 7/1992 | Miller | 160/231.1 X |
| 5,267,599 | 12/1993 | Kim | 160/370.23 |
| 5,738,161 | 4/1998 | Martin | 160/230 X |

*Primary Examiner*—David M. Purol
*Attorney, Agent, or Firm*—Henry M. Feiereisen

[57] ABSTRACT

An articulated sectional overhead gate, in particular for a commercial vehicle, includes a plate-shaped body structure comprised of a plurality of rigid panels made from a single-layer plastic strip, multi-layer plastic strip or laminate of different material layers, and a hinged connection for articulating the panels to one another such that flexible zones are created between consecutive panels. The flexible zones are effected through formation of depressions spaced along at least one side of the body structure.

14 Claims, 4 Drawing Sheets

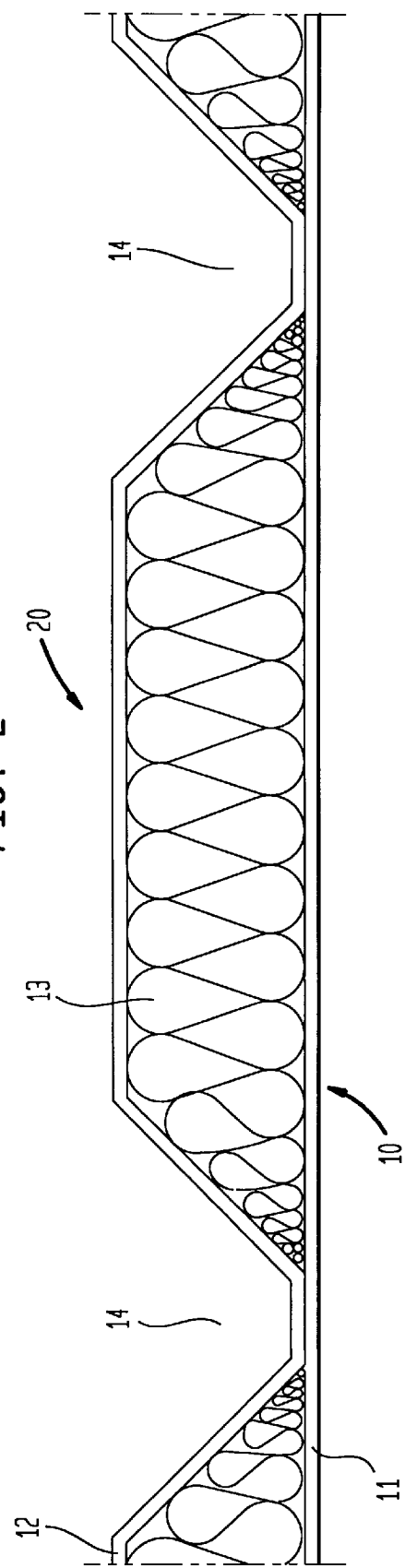
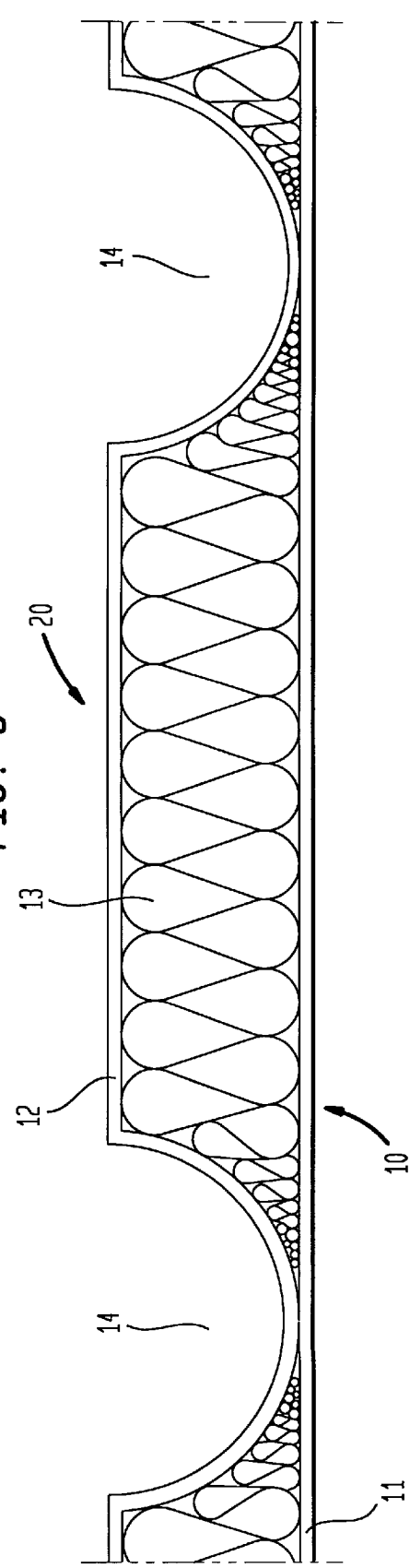

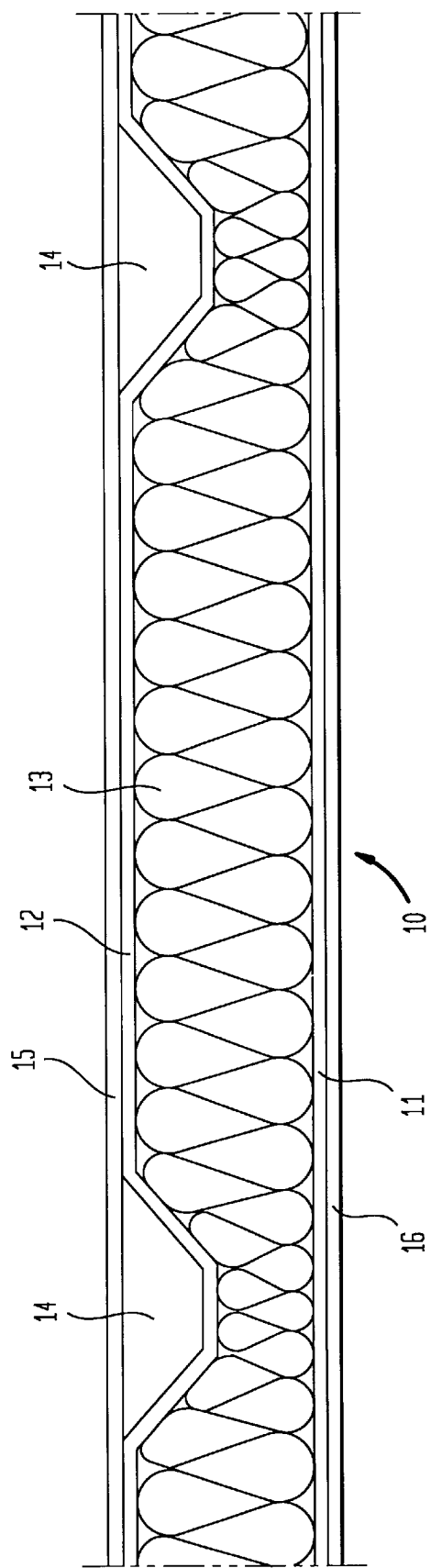
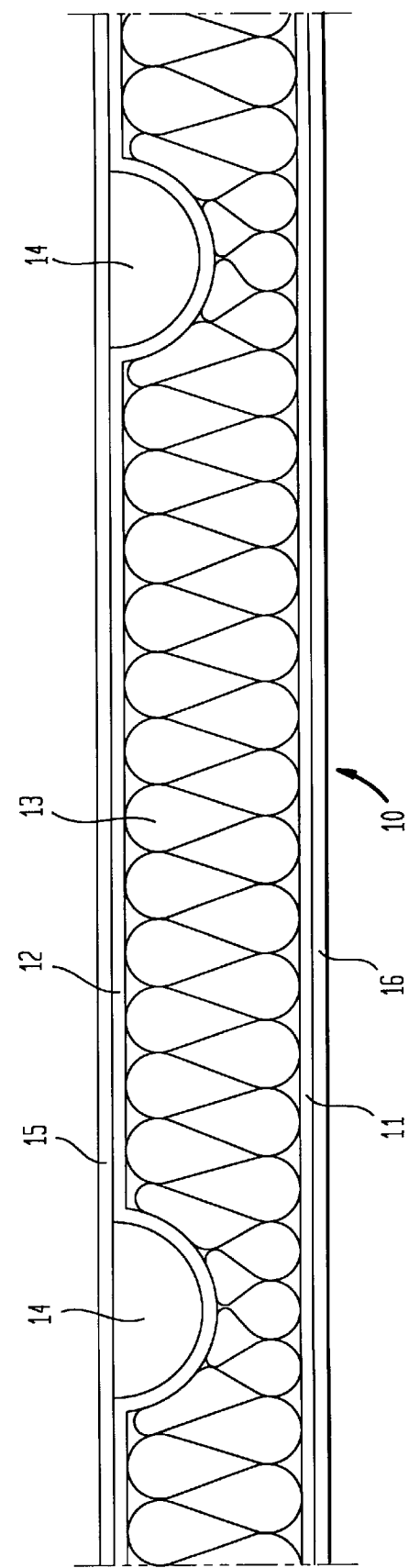

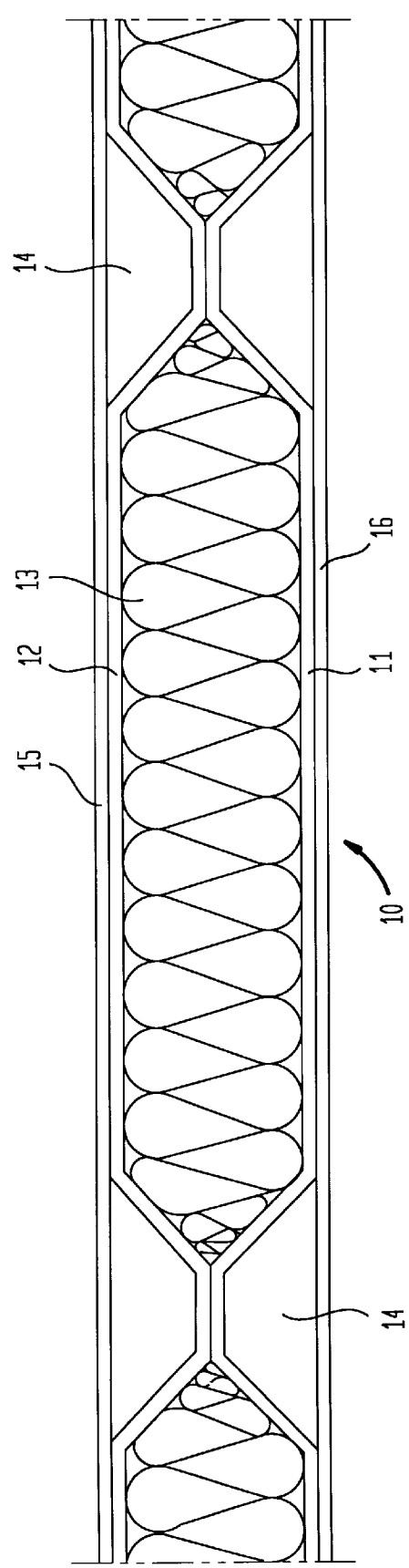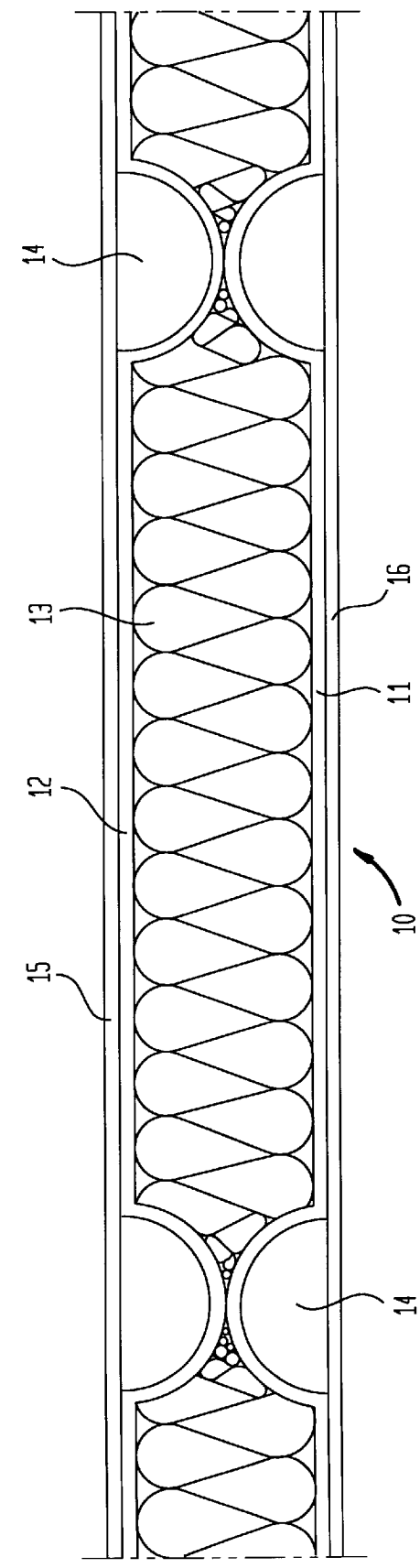

5,915,445

SECTIONAL OVERHEAD GATE

BACKGROUND OF THE INVENTION

The present invention generally relates to a sectional overhead gate, in particular for utility vehicles, and in particular to an articulated overhead gate of a type having a plate-shaped body structure formed essentially of a plurality of consecutive panels or lamellae members articulated to one another.

This type of overhead gate is used especially for commercial vehicles such as trucks and trailers as well as containers for such vehicles, and include a plurality of panels that are articulated to one another along the direction the gate moves so that during transition between the closed state to the open state travel along a curved track between a substantially vertical disposition and a horizontal disposition. The articulation between the panels enables the plate-shaped body structure to travel through the curved section and, optionally, to be coiled to a roll, if necessary. The body structure (also called "filling plate") of conventional overhead gates is normally so formed especially from steel, aluminum or plastic as to exhibit a stiffness at least in transverse direction. The individual panels should be movably joined with one another to permit a deflection or roll-up of the plate-shaped body structure, if required. The articulation between individual panels is normally formed either by hinges or by so profiling the opposing side edges of the individual panels that the profiled areas movably interlock with one another.

These known constructions have the drawback that the individual panels of the plate-shaped body structure must be shaped by means of respective tools or, if made from plastic material, through extrusion. Even when providing a construction without hinges, the assembly costs become significant. Also, in case the individual panels are made of metal, the weight becomes relatively high so that e.g. roll-up gates require the provision of an auxiliary drive, e.g. a spring shaft with biased springs to enable an opening of the gate. In the event an electromotive drive is used for opening and closing, the driving power must then be accordingly high.

SUMMARY OF THE INVENTION

It is thus an object of the present invention to provide an improved sectional overhead gate, obviating the afore-stated drawbacks.

In particular, it is an object of the present invention to provide an improved sectional overhead gate which is capable of being deflected or rolled up, without requiring separate hinges or interlocking edge profiling of the panels.

These objects, and others which will become apparent hereinafter, are attained in accordance with the present invention by providing a body structure in the form of panels made from single-layer plastic strips, multi-layered plastic strips, or laminates of different material layers; and articulated to one another by a hinged connection in the form of at least one flexible strip which is formed in one piece with the panels or with at least one layer of the panels.

Unlike conventional constructions, the present invention enables the use of plastic panels or plate-shaped laminates that are commercially available on a large scale, for fabrication of the body structure. As these panels or laminates are made of plastic material, they can thus be treated extremely easily. Depending on the type of plastic material, the flexible strips can be shaped in heated state in non-cutting fashion or through a material removing process. The use of plastic panels enables fabrication of a single-piece plate-shaped body structure, and it is also conceivable that at a respective size of the body structure, several such elements can be joined together in the event the size of the body structure exceeds for example the standard dimensions of commercial plastic panels. The mobility of the panels is effected by the flexible strips between the individual panels, with the flexible strips resembling film hinges and designed according to the type of used plastic panels.

The plate-shaped body structure according to the invention is suitably made of alternating rigid and flexible zones so that the plate-shaped body structure can be coiled to a roll or deflected along a curved track, depending on the application. The used materials allow a significant weight reduction of the body structure compared to conventional designs so that the formed sectional overhead gate may be opened at much less force, and electromotive drives can be operated at extremely low output.

The flexible strips can be made in a simple manner when the plate-shaped body structure is made of thermoplastic material. Suitably, the flexible strips can be made through deformation of the plastic panel by heat-application and pressure. An appropriate tool allows production of flexible strips also through a material removal process, whereby the use of thermoplastic material allows operation at significant cutting speed. The flexible strips are created in both cases by forming depressions at least on one side of the body structure so that the thickness of the flexible strips is significantly smaller in relation to the thickness of the panels.

In accordance with a first embodiment, the plate-shaped body structure is made from a sandwich panel comprised of three layers and formed at least on one side with spaced-apart, parallel depressions for thickness reduction so as to form flexible zones. Preferably, the three layers are so designed that the thickness of both outer face layers is significantly smaller than the thickness of the central layer that forms the core member, resulting in a sufficient stiffness of the plate-shaped body structure and in a superior thermal insulation.

Advantageously, the core member is made of a material of relatively low density, e.g. honeycombed material, foam, fiber material or the like, so that the weight can be even further reduced and the formation of depressions for creating flexible strips is particularly simple. Suitably, the core member and the cover sheets are made of a material which is deformable under the influence of heat and pressure. Thus, the plate-shaped body structure can be produced from a sandwich panel in non-cutting manner by suitable tools in one step. The outer face layers and the core member may be made from suitable plastic material such as polypropylene so that the plate-shaped body structure can then be recycled as well.

Suitably, the depressions can be so selected that both outer face layers are connected to one another, preferably through welding because immediately after formation of the depressions through pressing, the welding operation may be carried out. The depressions are so designed as to contact both face layers for welding, and may have V-shaped cross section, trapezoidal cross section or semi-circular configuration so as to expand toward the jointed region of both face layers to the outer side or outer sides. A fabrication of the depressions through heat-treatment and pressure results in jointless surfaces, regardless of the respective design, while yet ensuring the mobility of the rigid panels.

Regardless of the selected design of the thermoplastic plates for fabrication of the body structures, it is also possible to form on both sides depressions in opposite disposition. The formation of depressions on both sides has the advantage that the deformation can be configured less pronounced compared to depressions on only one side. On the other hand, the provision of depressions on only one side has the advantage that the other side, e.g. the visible side, can be smooth, thereby reducing deposit of dirt or the like and permitting easier cleaning. This effect may however also be achieved in connection with a body structure made from several layers or from a laminate, by covering at least the side of the body structure formed with the depressions, preferably both sides, with a cover sheet.

Suitably, a massive plate is used as starting material, even when the central core member is of honeycomb configuration, of foam or fiber material. Conceivably, the initial plate may however also be a hollow section, with the outer wall surfaces being connected to one another through welding. Also in this type of design, the use of cover sheets is possible.

BRIEF DESCRIPTION OF THE DRAWING

The above and other objects, features and advantages of the present invention will now be described in more detail with reference to the accompanying drawing in which:

FIG. 2 is a schematic side view of a plate-shaped body structure in the form of a three-layered sandwich panel, with formation of a first variation of depressions;

FIG. 3 is a schematic side view of a plate-shaped body structure in the form of a three-layered sandwich panel, with formation of a second variation of depressions;

FIG. 4 is a schematic side view of a plate-shaped body structure assembly in the form of a sandwich panel, with the body structure assembly being covered on both sides with a cover sheet and formed with depressions extending to about half a thickness of the body structure; and FIG. 5 is a schematic side view of a plate-shaped body structure assembly in the form of a sandwich panel, with the body structure assembly being covered on both sides with a cover sheet and formed with a different design of depressions extending to about half a thickness of the body structure;

FIG. 6 is a schematic side view of a plate-shaped body structure assembly in the form of a sandwich panel, with the body structure assembly being covered on both sides with a cover sheet and formed with depressions extending on both sides of the body structure; and FIG. 7 is a schematic side view of a plate-shaped body structure assembly in the form of a sandwich panel, with the body structure assembly being covered on both sides with a cover sheet and formed with a different design of depressions extending on both sides of the body structure.

DETAILED DESCRIPTION OF PREFERRED EMBODIMENTS

Figure 1:
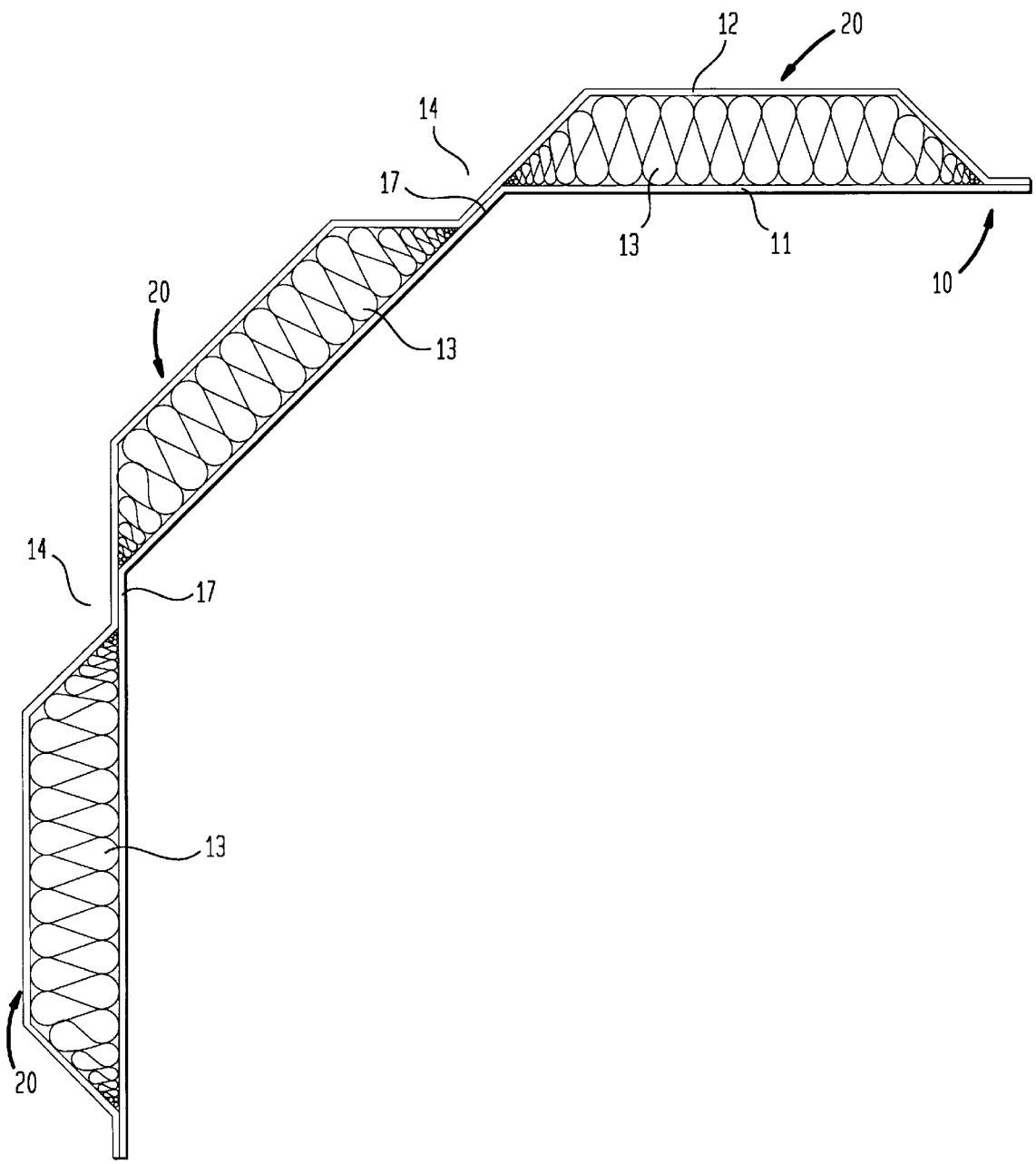
FIG. 1 is a schematic side view of a plate-shaped body structure for fabrication of a sectional overhead gate according to the present invention.

Throughout all the Figures, same or corresponding elements are generally indicated by same reference numerals.

Turning now to the drawing, and in particular to FIG. 1, there is shown a schematic side view of a plate-shaped body structure, generally designated by reference numeral 10 for fabrication of a sectional overhead gate according to the present invention including. The body structure 10 is made from a laminate formed by sandwiching a core member 13 between a pair of outer face layers 11, 12 which are made from a plastic sheet, e.g. of polypropylene. The face layers 11, 12 have each a thickness that is relatively large for these types of sheets, but is relatively small in proportion to the overall thickness of the body structure 10. The core member 13 forming the center layer of the body structure 10 may have a honeycomb structure, or may also be made from a foamed material or distance fabric.

As shown in particular in FIG. 2, the body structure 10 is evenly recessed over its length through formation of depressions 14 extending from one side toward the opposite side of the body structure 10, with the zones situated between the depressions 14 forming rigid panels or lamellae 20, while the areas of the depressions 14 form flexible strips 17 to allow deflection along a curved track, as shown in FIG. 1, or roll up of the body structure 10. Depending on the type of starting material, each flexible strip 17 can be formed by at least one layer of the face layer 11, 12 and connected to at least one layer of the panel 20. In the embodiment of FIGS. 1 and 2, the flexible strips 17 are formed by two layers, i.e. sections of both face layers 11, 12, which sections are connected to one another through welding.

In the embodiment of FIG. 2, the depressions 14 exhibit a trapezoidal configuration and extend over the entire height of the core member 13 so that the face layer 12 is in direct contact with the opposing face layer 11 in the area of the base of the depression 14. In the embodiment of FIG. 3, the depressions 14 are of arcuated configuration or may be V-shaped, with the area where both face layers 11, 12 are in direct contact being joined together by welding.

Thus, the formation of the depressions 14 affords the body structure 10 according to the present invention with flexible zones resembling a film hinge so that consecutive panels 20 can be positioned at an angle, as shown e.g. in FIG. 1 to travel along a curved track, with the maximum possible pivot range being defined by the configuration of the depressions 14.

Although not shown in detail, persons skilled in the art will understand that the body structure 10 may also be formed on both sides with depressions positioned at a same level but not necessarily of same depth to generate a particular texture or decor instead of a smooth outer surface. Examples thereof are shown in FIGS. 6 and 7.

FIGS. 2 and 3 indicate further the ability to fabricate the depressions 14 in a single operation through use of a suitable tool, by plastifying the areas of the depressions though heat application. Shaping of the depressions 14 can then be effected by dies or rams which are pressed into the sandwich panel. It will be understood by persons skilled in the art that the face layers 11, 12—in the event both sides are formed with depressions—, or the face layer 12—in the event of forming depressions on only one side, as shown in FIGS. 1 to 3—, should have extendible characteristics. The core member 13 is compacted along the side flanks of the depressions 14.

Turning now to FIG. 4, there is shown a modified body structure 10 formed with depressions 14 extending from one side (here from face layer 12) to about half the thickness of the body structure 10, with the depressions 14 exhibiting a trapezoidal shape. FIG. 5 shows an example of a body structure 10 with depressions 14 of semi-circular configuration. Depending on the type of material used for the core member 13, the depth of the depressions 14, as shown in FIGS. 4 and 5 may already be sufficient to create flexible areas.

As shown in FIGS. 4 and 5, the body structure 10 is covered on both sides with a cover sheet 15, 16 to thereby render the depressions 14 invisible from outside and afford the body structure 10 a pleasing look. The cover sheets 15, 16 have a thickness which is relatively small in proportion to the overall thickness of the body structure 10. Preferably, the cover sheets 15, 16 are made from a plastic film which is bonded onto the outside of the face layers 11, 12 or secured in any other suitable manner. Persons skilled in the art will understand that the cover sheets 15, 16 should be of flexible nature to enable a wrapping around the body structure 10 or coiling. Certainly, it is within the scope of the present invention to provide a cover sheet over only one side of the body structure 10, whereby, preferably, the cover sheet is attached on the side that is recessed through formation of the depressions 14.

The depressions 14 are suitably made through hot-forming because the plastic plate is made preferably form a thermoplastic material. In dependence on the depth of the depressions, the core member 13 is compacted to a varying degree in the areas adjoining the depressions. It will be understood by persons skilled in the art that the depressions may certainly also be formed through a mechanical process, e.g. milling.

The foregoing description should not be limited to the formation of a plate-shaped body structure on the basis of a laminate. It is certainly within the scope of the invention to fabricate the body structure from a single layer plastic panel or multi-layer plastic plate, whereby the plate is formed with depressions or recesses through a material removing process, with the depressions having such a depth that the remaining material exhibits flexible characteristics.

While the invention has been illustrated and described as embodied in a sectional overhead gate, it is not intended to be limited to the details shown since various modifications and structural changes may be made without departing in any way from the spirit of the present invention.

What is claimed as new and desired to be protected by Letters Patent is set forth in the appended claims:

1. A sectional overhead gate; comprising a plate-shaped body structure comprised of a plurality of rigid panels made from an element selected from the group consisting of single-layer plastic strip, multi-layer plastic strip, and laminate of different material layers; and hinged means for connecting adjacent panels to one another, said hinge means being formed by least one flexible strip formed in one piece with the panels or at least one layer of the panels to thereby realize a continuous unitary arrangement of the panels of the body structure.

2. The overhead gate of claim 1 wherein the plate-shaped body structure is made of a thermoplastic material.

3. The overhead gate of claim 1 wherein the plate-shaped body structure is made in sandwich construction by at least three layers and so formed at least on one side with thickness-reducing depressions in spaced-apart parallel disposition that flexible zones are defined.

4. The overhead gate of claim 3 wherein the plate-shaped body structure is made of three layers with a central layer forming a core member and disposed between two outer face layers, said face layers having a thickness which is significantly smaller than the thickness of the central layer.

5. The overhead gate of claim 4 wherein the core member is made of a material of relatively small density.

6. The overhead gate of claim 5 wherein the core member is made of a material selected from the group consisting of honeycombed material, foam, and fiber material.

7. The overhead gate of claim 5 wherein the core member and the face layers are made of a material which is deformable when subject to heat and pressure.

8. The overhead gate of claim 5 wherein the face layers are connected to one another in an area of the depressions.

9. The overhead gate of claim 8 wherein the face layers are connected to one another in the area of the depressions by welding.

10. The overhead gate of claim 3 wherein the depressions are formed on one side of the body structure.

11. The overhead gate of claim 3 wherein the depressions are formed on both sides of the body structure.

12. The overhead gate of claim 10, and further comprising a cover sheet for covering the one side of the plate-shaped body structure formed with the depressions.

13. The overhead gate of claim 11, and further comprising two cover sheets for covering both sides the plate-shaped body structure.

14. The overhead gate of claim 1 in the form of a hollow section having outer wall surfaces connected to one another by welding.

* * * * *